(12) United States Patent
Ready

(10) Patent No.: US 10,386,799 B2
(45) Date of Patent: Aug. 20, 2019

(54) METHOD AND SYSTEM FOR DEFINING A 3D PRINTED OBJECT

(71) Applicant: Palo Alto Research Center Incorporated, Palo Alto, CA (US)

(72) Inventor: Steven E. Ready, Los Altos, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 496 days.

(21) Appl. No.: 14/704,176

(22) Filed: May 5, 2015

(65) Prior Publication Data
US 2016/0325501 A1    Nov. 10, 2016

(51) Int. Cl.
| G05B 15/02 | (2006.01) |
| B33Y 50/00 | (2015.01) |
| B29C 64/386 | (2017.01) |
| B33Y 50/02 | (2015.01) |
| G05B 19/4093 | (2006.01) |

(52) U.S. Cl.
CPC ............ G05B 15/02 (2013.01); B29C 64/386 (2017.08); B33Y 50/00 (2014.12); B33Y 50/02 (2014.12); G05B 19/40937 (2013.01); G05B 2219/49023 (2013.01); Y02P 90/265 (2015.11)

(58) Field of Classification Search
CPC ..... B29C 67/0088; B33Y 50/00; B33Y 50/02; G05B 15/02
USPC ........................................................ 700/119
See application file for complete search history.

(56) References Cited

U.S. PATENT DOCUMENTS

| 6,658,314 | B1 | 12/2003 | Gothait |
| 7,658,464 | B2* | 2/2010 | Silverbrook ............ B22F 3/008 |
| | | | 2/7 |
| 7,926,900 | B2 | 4/2011 | Srinivasan et al. |
| 8,226,395 | B2 | 7/2012 | Pax et al. |
| 2004/0036731 | A1 | 2/2004 | Ready et al. |
| 2004/0196329 | A1 | 10/2004 | Ready et al. |
| 2005/0142293 | A1 | 6/2005 | Ready et al. |
| 2009/0201325 | A1 | 8/2009 | Ready et al. |
| 2010/0231636 | A1 | 9/2010 | Ready et al. |
| 2010/0231637 | A1 | 9/2010 | Ready et al. |
| 2010/0231638 | A1 | 9/2010 | Ready et al. |
| 2013/0287933 | A1* | 10/2013 | Kaiser ................. B29C 67/0055 |
| | | | 427/9 |

(Continued)

OTHER PUBLICATIONS

Topcu et al., "A Method for Slicing CAD Models in Binary STL Format", 6th Int'l Advanced Technologies Symposium (IATS '11), May 16-18, 2011, Turkey, pp. 141-145.

(Continued)

*Primary Examiner* — Robert E Fennema
*Assistant Examiner* — Christopher W Carter
(74) *Attorney, Agent, or Firm* — Fay Sharpe LLP

(57) ABSTRACT

Provided is a method and system which uses a 3D additive manufacturing system having more than a single 3D additive manufacturing subsystem. The operation employs a set of control files including a first control file with part names and method names which correspond to particular ones of the part names. Additional files in the set of control files include a plurality of method control files, describing the methods named in the first control file. The method control files are configured to include (i) control parameter names, and (ii) values associated with the parameter names.

22 Claims, 16 Drawing Sheets

(56) References Cited

U.S. PATENT DOCUMENTS

| | | | |
|---|---|---|---|
| 2015/0045928 A1* | 2/2015 | Perez | B29C 64/112 700/110 |
| 2015/0057784 A1* | 2/2015 | Butler | B29C 67/0088 700/119 |
| 2015/0064299 A1* | 3/2015 | Koreis | G06Q 30/0603 425/375 |
| 2015/0096266 A1* | 4/2015 | Divine | B29C 67/0088 53/452 |
| 2015/0266242 A1* | 9/2015 | Comb | G03G 15/224 264/40.1 |
| 2016/0012459 A1* | 1/2016 | Heindel | G06Q 30/0206 705/7.35 |

OTHER PUBLICATIONS

Robinson, Blog "[Infographic] The Power of 3D Printing in Manufacturing: An Illustrated Guide", 3D Printing Infographics Manufacturing, Dec. 10, 2014, 14 pgs.

* cited by examiner

|   | A | B | C |
|---|---|---|---|
| 1 | Attribute | Value | Units |
| 2 | Priority | 1 | |
| 3 | Deposition Method | Extrusion 1 | Pick One |
| 4 | Print Speed | 15 | (mm/sec) |
| 5 | Setup Speed | 300 | (mm/sec) |
| 6 | Acceleration | 30 | (mm/sec^2) |
| 7 | Path Method | Meander | Pick One |
| 8 | Line Stepover | 0.2 | (mm) |
| 9 | Line Height | 0.07 | (mm) |
| 10 | Fill To Slice | FALSE | TRUE/FALSE |
| 11 | Start Distance | 0 | (mm) |
| 12 | Stop Distance | 0 | (mm) |
| 13 | Perimeter Offset From Edge | 0.2 | (mm) |
| 14 | Turn Radius | 0.1 | (mm) |
| 15 | Distance From Perimeter At Turn | 0.1 | (mm) |
| 16 | Single Line Lower Width | 0.21 | (mm) |
| 17 | Single Line Upper Width | 0.4 | (mm) |
| 18 | Meander Starting Angle | 90 | Degrees |
| 19 | Meander Rotation Angle | 0 | Degrees |
| 20 | Extrusion Start Time | 30 | msec |
| 21 | Extrusion Stop Time | 20 | msec |
| 22 | Profile | FALSE | TRUE/FALSE |
| 23 | Nozzle Print Height | 0.1 | (mm) |
| 24 | Cure Method | None | Pick One |
| 25 | Cure Passes | 4 | N |
| 26 | Cure Slice | 0 | # Slices |
| 27 | Cure Height | 20 | (mm) |
| 28 | Cure Speed | 5 | (mm/sec) |
| 29 | Cure Power | 65 | % |
| 30 | Cure Start Offset | 20 | (mm) |
| 31 | Cure Stop Offset | 20 | (mm) |
| 32 | Maintenance Step | FALSE | TRUE/FALSE |
| 33 | Notification | | email or texting address |

METHOD AND SYSTEM FOR DEFINING A 3D PRINTED OBJECT

BACKGROUND

The present application relates generally to design and manufacturing. It finds particular application in conjunction with 3-dimensional (3D) additive manufacturing, and will be described with particular reference thereto. However, it is to be appreciated that the present application is also amenable to other applications.

3D additive manufacturing, also known as 3D printing and layered manufacturing, among other terms, includes the process of building 3-dimensional solid shapes by accumulating material laid down in cross-sectional layers. The additive manufacturing process is driven by the controlled planar translation of a mechanism that determines the spatial accumulation of material. As 3D additive manufacturing advances, it is desirable to find improvements that increase efficiency of the manufacturing process as well as the ability to manufacture increasingly complex 3D multi-part objects.

BRIEF DESCRIPTION

Provided is a method and system for 3D processing which includes storing an assembly of parts, with each part having a unique name identifier. The assembly of parts is stored as a set of electronic files in a file format compatible with 3D additive manufacturing processes, with at least one compatible file for each part. A set of control files, having a plurality of individual control files are then created. The set of control files include a first control file with part names and method names which correspond to particular ones of the part names. Additional files in the set of control files include a plurality of method control files, describing the methods named in the first control files. The method control files are configured to include (i) control parameter names, and (ii) values associated with the parameter names. Thereafter a 3D build program is operated or run for a specified set of control file. The running of the build program includes reading the first control file of the set of control files, which instructs the 3D build program which 3D additive manufacturing compatible files are to read in, and further reading the method control files which are named in the first control file, and associating each method's parameters and parameter values with the parts of the first control file. Thereafter, build operations are performed on a slice-by-slice basis in accordance with instructions of the 3D build program.

In accordance with another embodiment, provided is a 3D assembly production method and system which: (a) employs a 3D additive manufacturing system having at least two distinct 3D additive manufacturing subsystems which perform at least two distinct 3D additive manufacturing methods for forming layers, and which employ corresponding materials to be laid down as the layers, wherein the materials are distinct from each other and correspond to the at least two distinct 3D additive manufacturing subsystems and methods; (b) stores a digitized assembly of parts, with each part having a unique name identifier, as a set of part files with at least one part file for each part of the assembly of parts in a file format compatible with a 3D additive manufacturing process implemented by the 3D additive manufacturing system; (c) creates a set of control files including, (1) a first control file linking the part names and method names, the method names corresponding to particular ones of the part names; (2) a plurality of method control files, describing the methods named in the first control file, wherein the method control files (i) contain parameter names, and (ii) values associated with the parameter names; (d) runs a 3D build program, for a specified set of control files including, (1) reading the first control file of the set of control files, which instructs the 3D build program which 3D additive manufacturing compatible files to read in, and (2) reading the method control files which are named in the first control file and associating each method's parameters and parameter values with the parts of the first control file; and (e) performs build operations on a slice by slice basis in accordance with instructions of the 3D build program.

BRIEF DESCRIPTION OF THE DRAWINGS

FIG. 15 depicts method control spreadsheet(s) of a plurality of method control spreadsheets, which correspond to and/or are called by the first control spreadsheet of FIG. 14 when operating the method of FIGS. 13A-13B;

DETAILED DESCRIPTION

The present application describes a system and method to organize and specify the additive manufacture of multi-part 3D objects designed to include different materials, different deposition methods and designs from potentially multiple disparate CAD sources. For example, the present teachings permit for the additive manufacture of multi-part 3D objects, made up of an assembly for parts, where the parts are constructed of distinct materials which need to be deposited in accordance with distinct deposition methods, and potentially requiring different inter/post deposition treatments (e.g., UV, IR, thermal heating, etc.). The assembly of parts is commonly designed with 3D modeling design software (e.g., such as but not in any manner limited to SolidWorks® (from Solid Works Corp.)), as well as 2D design software.

The parts made up of deposited material can function as structural, mechanical, electrical or optical components, as well as others. The electrical material parts can be made of dielectric, semiconducting or conducting material, among others.

Still further, the present application provides systems and methods for measuring the topology of layers consisting of different types of materials to ensure a proper height distribution and an even layered object design. In addition, the system and method described herein permits for the folding or embedding into the design pre-constructed components such as but not limited to integrated circuits, resistors, capacitors, optical devices, magnets or sensors. Embodiments of the system and method described herein are configured to also be able to print electrical components such as polymer TFTs, resistors, capacitors, conductors, optical components and sensors, which are designed with IC or PCB layout software, including but not limited to that of L-Edit (from Tanner EDA) and PADS (from Mentor Graphics). It is to be understood the above are just an examples of types of printed and pre-constructed components, and is not intended to be limiting.

Figure 1:
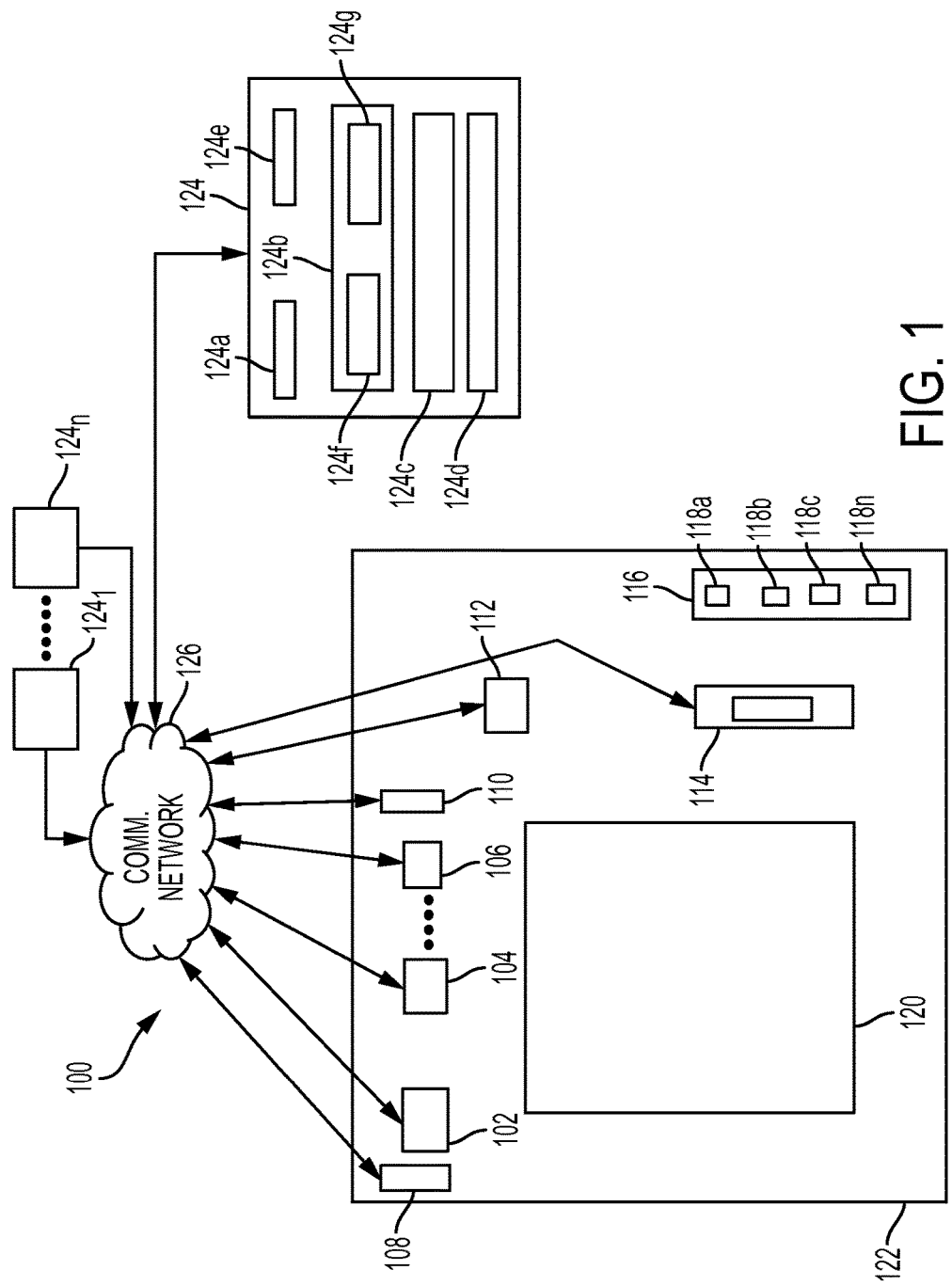
FIG. 1 illustrates a top view of a 3D additive manufacturing system in accordance with the present application.

With attention to FIG. 1, illustrated is a top view of a 3D additive manufacturing system 100, configured with multiple (i.e., two, three or more), distinct 3D additive manufacturing subsystems 102, 104, 106, which perform multiple, distinct 3D additive manufacturing methods for forming layers, and which employ materials to be deposited in layers. The materials being used are commonly distinct from each other and correspond to the particular subsystem 102, 104, 106 with which they are associated. At least one, but more commonly, two, three or more, in process and/or post process curing or setting subsystems 108, 110 are also provided, such that when necessary for a particular subsystem operation, the curing and/or setting of subsystems 108 and 110 may be implemented during the build process, as well as post build.

Further included is a measuring or topology identifying system (e.g., a laser or optical based or other appropriate measurement system) 112, along with a pick-and-place (e.g., robotic arm system) 114, and a carrier 116 holding a plurality of pre-constructed components 118a-118n. As can be further seen in the top view of FIG. 1, a platform or platen 120 is located within a build area 122. Build area 122 may be a flat surface, or it may have walls in which case the various components are within the walls when required.

It is to be appreciated the illustrated build area 122 is illustrated to emphasize that all additive manufacturing of the multi-part object occurs at a single location (i.e., the object is not partially built at one location and then moved to another location for additional manufacture). It is, however, understood that once built, the object may be moved to another location for post-build operations (e.g., additional curing or setting, cleaning operations, etc.). Therefore, build area 122 is intended to represent multiple configurations depending on how subsystems 102, 104, 106 are implemented (and the number of subsystems implemented). In certain embodiments computing device 124 (discussed below) may be included within the build area 122, when, for example, the computing device is connected directly to the mentioned components (e.g., 102-114, 120). In other embodiments certain ones of the components (e.g., 102-114) are commonly located outside of the build area 122.

The various named components are in operative communication with computing device 124. In one embodiment, communication is through a communication network 126. The communication network 126 is typically the internet, but can be any communication network, such as a local area network or a wide area network. The interconnections may be hardwired, or may be wireless. It is to be appreciated the connections may also be made directly to the mentioned components, such as through a direct communication connection to the individual components, or by other known arrangements.

The computing device 124 includes at least one electronic processor 124a, memory 124b, a display device 124c, a user input (e.g., keyboard, mouse, voice system, etc.) 124d, and an input/output communication area 124e. In at least one embodiment, the at least one processor 124a executes processor executable instructions stored in the memory 124b to provide a user with a graphical user interface (GUI) on the display device 124c. In at least one embodiment, the processor executable instructions include a design application 124f for functionality of the design system. The design application 124f can be a standalone application or a web application, where a web design application 124f is a web application. In this instance, the design application 124f is executed within a web browser 124g by processor-executable instructions. The computing device 124 is therefore configured to act as a controller to control operations of at least the previously mentioned components (102-114, 120). It is understood the computing device 124 may be a desktop computer, or portable device such as laptops, tablet computers, smart phones, a cluster of many computing machines and controllers or other device(s) amenable to the present concepts (e.g., items 124, $124_1$-$124_n$, which represent a plurality of computing devices that are, in various embodiments, configured to interconnect to an additive manufacturing system and/or with each other.

Figure 2:
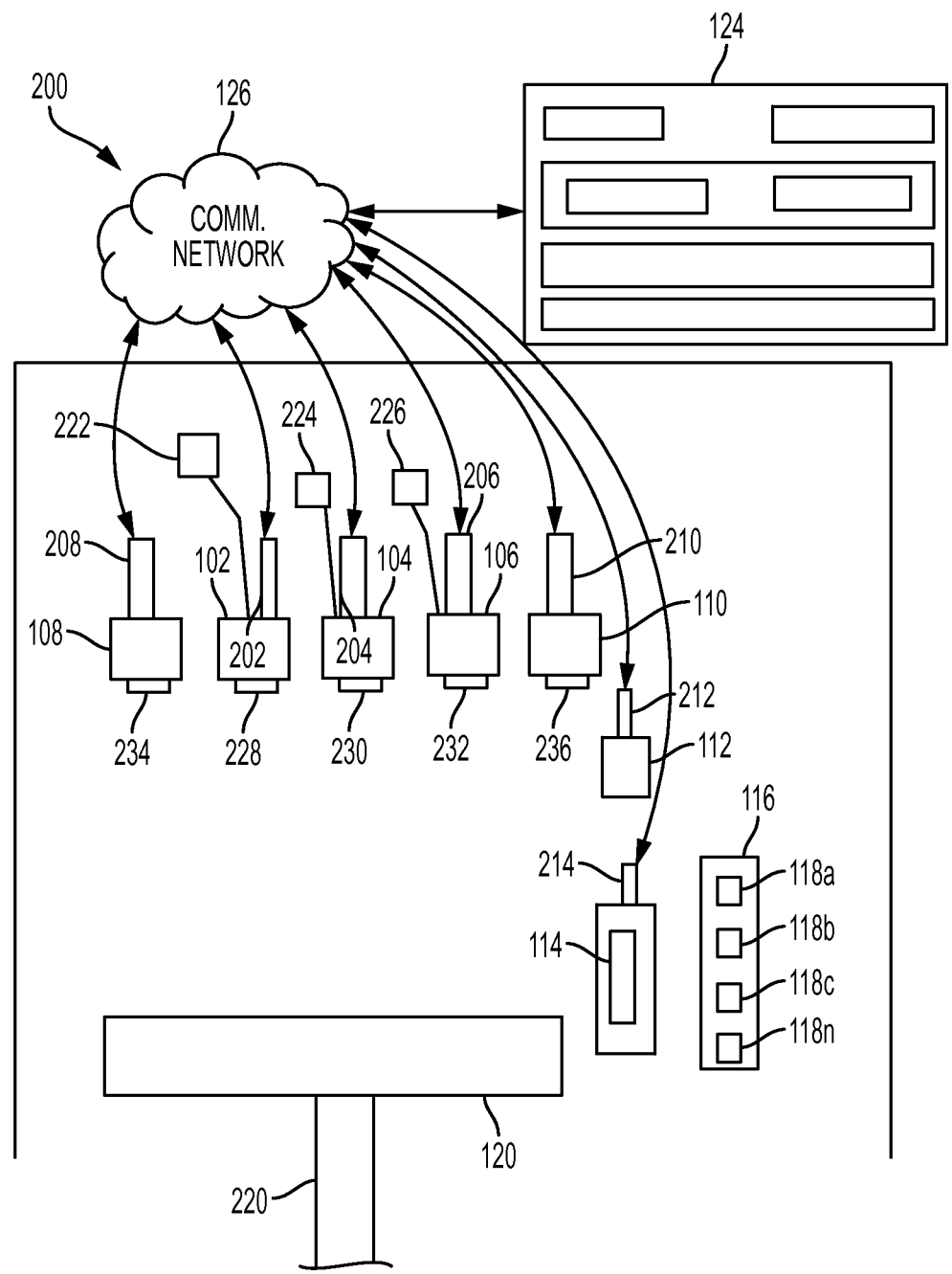
FIG. 2 depicts a side view of a 3D additive manufacturing system according to the present application.

FIG. 2 depicts a front view of a 3D additive manufacturing system 200 similar to system 100 of FIG. 1. The 3D additive manufacturing system 200 incorporates the 3D additive manufacturing subsystems, e.g., 102, 104, 106, platform or platen 120, along with the curing and/or setting subsystems 108 and 110. In addition to the similarities to FIG. 1, FIG. 2 provides additional detail by illustrating mechanical movement mechanisms 202, 204, 206, 208, 210, 212, 214 and 220 associated with the components introduced in FIG. 1. The mechanical movement mechanisms 202, 204, 206, 208, 210, 220 are configured to move the components 102, 104, 106, 108, 110, 112, 114 and 120 in various ones of x, y and z (axes) directions, as required by specific processing of selected 3D additive manufacturing subsystems, as is known in the art.

FIG. 2 also provides additional detail by illustrating material dispensing systems 222, 224, 226 configured to deliver particular material(s) needed by an associated subsystem 120, 104, 106. FIG. 2 still further depicts material dispensing elements 228, 230, 232, which may be nozzles, print heads, feeders, dispensing material, etc. Still further, shown are the active components 234, 236 (UV, IR, heating elements) of the curing and/or setting subsystems 108, 110.

3D manufacturing materials include, but are not limited to, plastics, polymers, metals, ceramics, wax, fibers, resins, among numerous other types of materials.

Attention is now returned to the topology identifying system 112 of FIGS. 1 and 2. A particular use of the topology identifying system 112 is to measure surface heights of a deposited layer to obtain topology information about the deposited layer. The obtained information is then used during a next deposition step (i.e., depositing a next layer) to provide an accurate manner of following the topology of the previously deposited layer(s). This is useful since even for the same material and same deposition methods (as well as situations where the material and deposition methods change) commonly there are uncontrolled height variations, and it is desirable to take such variations into account when depositing subsequent layers. The information obtained by employment of the topology identifying system 112, can also be used to control the overall z dimension of the components being built. This would occur in situations where an assumed or pre-set number of layers for a slice of a part is incorrect for the amount of material that is being laid down. The use of the obtained information allows a user to devise schemes to dynamically compensate for the variations. For example, and as will be explained in greater detail below, control instructions may be designed to automatically use information obtained from actual measurements of the topology identifying system 112 to replace the previously set number of layer depositing passes with a more accurate number of required layer depositing passes. This situation may often occur when the same and/or different materials are being laid down in the same slice.

Turning to FIGS. 3-11, more detailed views of certain additive manufacturing subsystems which may be used in systems 100, 200 are described, without limiting the possibility of the incorporation of other known 3D additive manufacturing subsystems.

Figure 3:
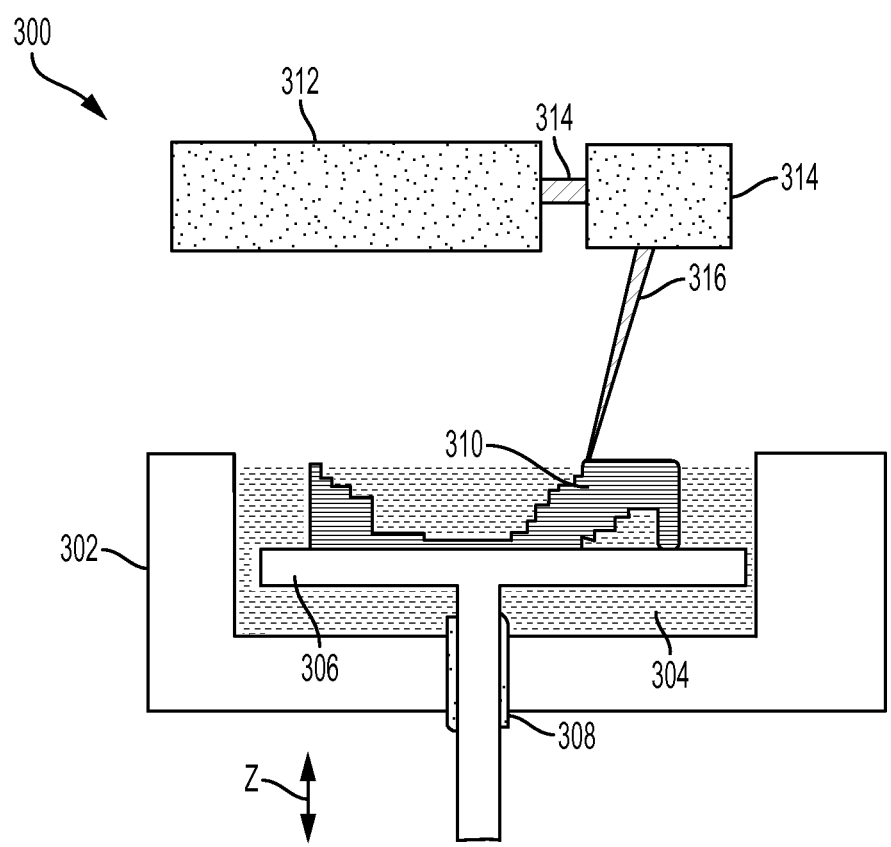
FIG. 3 illustrates a stereolithic and digital light processing subsystem configured for incorporation into the systems of FIGS. 1 and 2.

Turning attention to FIG. 3, depicted is a 3D stereolithographic subsystem 300, which includes a containment area 302 that holds a liquid resin or other material 304. A platform or platen 306 is moved in the z direction by a movement mechanism 308 on which the layers of a solid object 310 are developed. A laser 312 generates a laser beam to scanning network 314 whereby a scanning laser beam 316 is aimed at appropriate locations in the liquid resin 304 to form the solid layers of object 310 (such as in accordance with instructions from a computing device 124 of FIGS. 1 and 2). In one embodiment, the platform or platen 306 may be perforated and positioned just below the surface of the liquid resin 304. The scanning laser beam 316, which may be (but is not limited to) a UV laser traces the slices of an object on the surface of this liquid, causing a very thin layer of photopolymer to harden. The perforated platform or platen is then lowered slightly, and another slice is traced out and hardened by the laser. When the object is made of the same liquid resin, this process is repeated until a complete object has been printed and can be removed from the vat of photopolymer, drained of excess liquid and cured. When used in the multi-subsystem embodiments of FIGS. 1 and 2, the platform or platen may, in one embodiment, be moved above the containment area 302, and another subsystem (including its associated material delivery system) is moved into place for operation. In certain embodiments, to avoid contamination of the liquid resin or other materials, a physical cover (not shown) may be moved into place over the top of the containment area 302 while the other subsystem is in operation. The physical cover may have two sections which, when brought together, include an opening matching the circumference of the movement mechanism 308 to allow the movement mechanism to continue to operate (i.e., move in the z direction)

Figure 4:
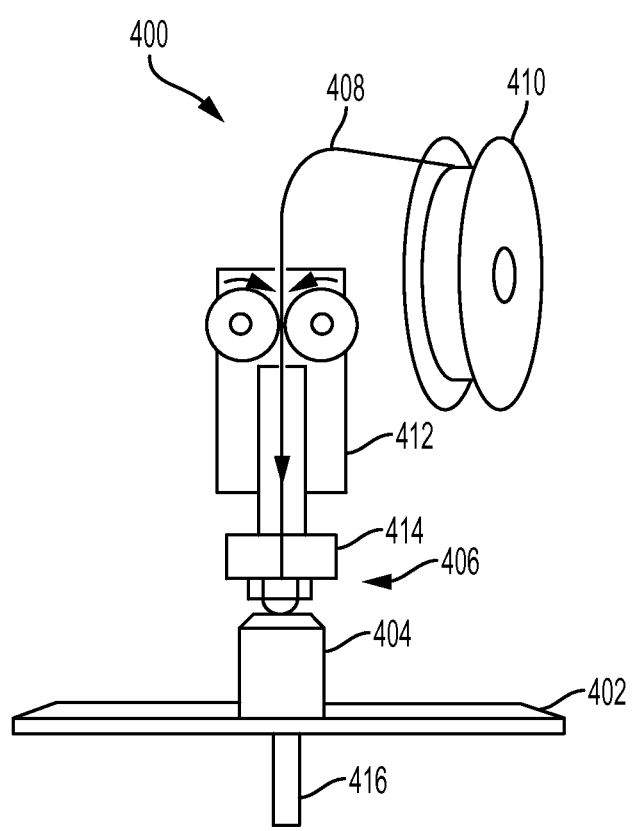
FIG. 4 illustrates a fused deposition modeling subsystem configured for incorporation into the systems of FIGS. 1 and 2.

Turning to FIG. 4, depicted is a 3D fused deposition modeling subsystem 400. In this embodiment, a platform or platen 402 on which a 3D object 404 is to be built via print head 406 that is being fed with filament 408 from a material dispensing arrangement (e.g., a filament spool) 410 as the filament is moved through an extruder 412. More particularly, the filament 408 is led to the extruder 412, where the extruder uses a torch and a pinch system to feed and retract the filament in precise amounts. A heater block 414 found near the print head melts the filament to a usable temperature. The heated filament is forced out of the heated nozzle at a smaller diameter, and the material is laid down on the platen in accordance with a predetermined model. In FIG. 4, the print head 406 is moved in the correct x/y/z position for placing the filament material by use of movement mechanisms such as previously described, and platform or platen 402 is moved by movement mechanism 416.

Figure 5:
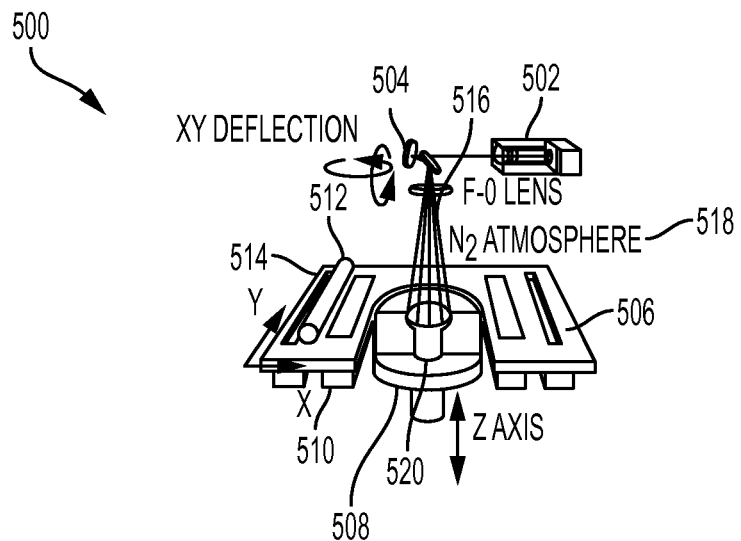
FIG. 5 illustrates a selective laser sintering (SLS) subsystem configured for incorporation into the systems of FIGS. 1 and 2.

Turning to FIG. 5, illustrated is a selective laser sintering subsystem 500 which includes a laser 502, a mirror/scanner arrangement 504, a platform or platen 506, moved by a movement mechanism 508 (z-direction movement), a feed container 510, and a roll 512 with an overflow area 514. A scanning laser beam 516 is directed through a $N_2$ atmosphere 518, whereby the subsystem 500 builds objects 520 by using scanning laser 516 to selectively fuse together successive layers of a mixture of powdered wax, ceramic, metal, nylon or one of a range of other materials, as is known in the art.

Figure 6:
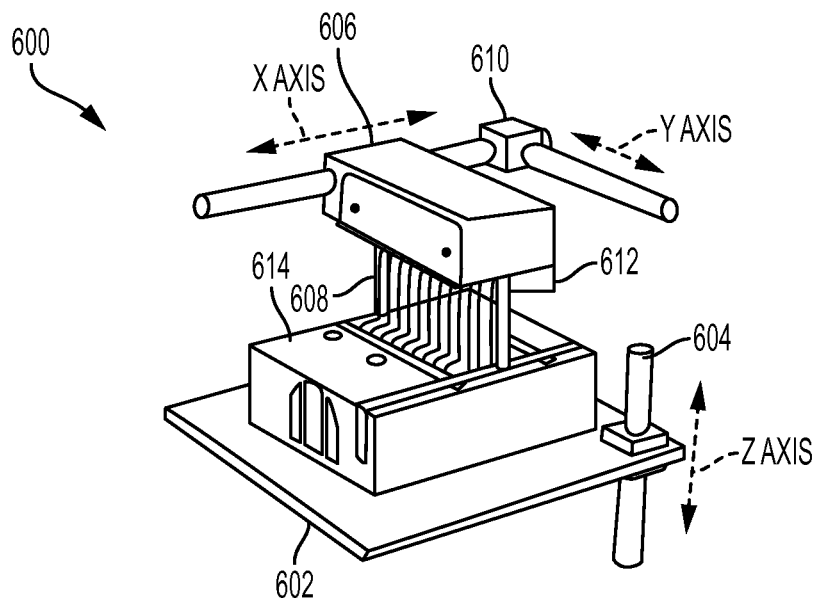
FIG. 6 illustrates a multi-jet modeling based subsystem configured for incorporation into the systems of FIGS. 1 and 2.

Turning to FIG. 6, illustrated is a multi-jet subsystem 600, including a platform or platen 602 which is movable in the z axis via movement mechanism 604, where the platform or platen 602 recedes as the multi-jet head 606 puts down layers of selected material 608. In this embodiment, the multi-jet head 606 is configured to move in the x and y axes by mechanical movement mechanisms 610, respectively. A curing and/or setting subsystem 612 (which may be a particular implementation of inter/post processing curing or setting subsystems 108, 110 of FIGS. 1 and 2) is provided to assist in curing the material as it is laid to form object 614. Thus, the multi-jet subsystem 600 builds up objects from successive layers with an inkjet-like print head.

Figure 7:
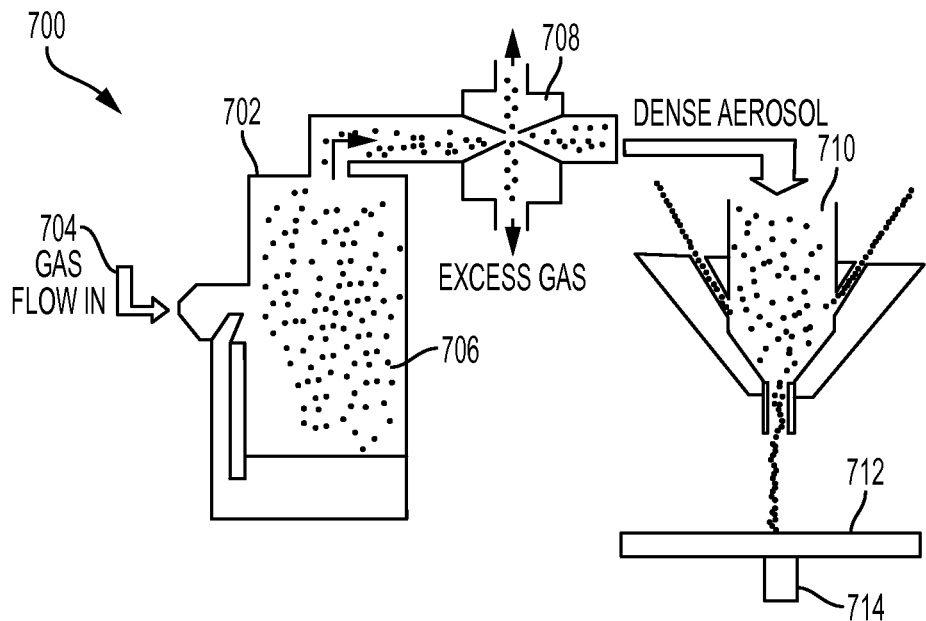
FIG. 7 illustrates an aerosol based subsystem configured for incorporation into the systems of FIGS. 1 and 2.

Turning to FIG. 7, illustrated is an aerosol 3D additive manufacturing subsystem 700 which includes a container of material 702 with a gas inflow portion port 704. Gas assists in moving the material forming particles 706 from chamber 702 to a metering section 708 where excess particles are removed. The metered particles are provided to a delivery system 710, which layers the particles onto a platform or platen 712, which may be moved by movement mechanism 714, in a manner as is known in the art.

Figure 8:
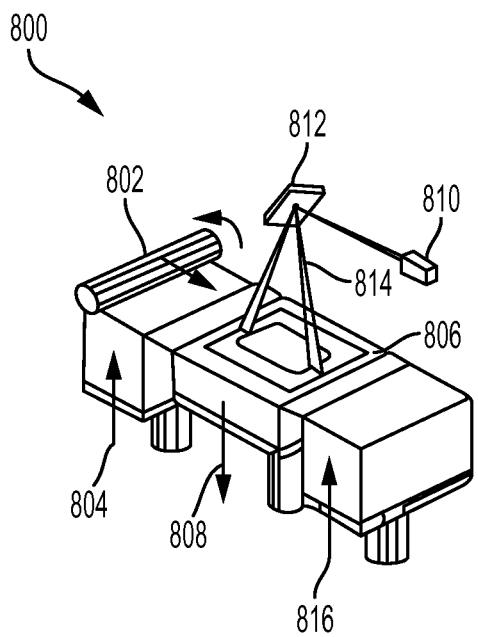
FIG. 8 illustrates a powder bed and binder based subsystem configured for incorporation into the systems of FIGS. 1 and 2.

Turning to FIG. 8, illustrated is a 3D powder bed and binder based subsystem 800, which includes a power feed roller 802, a powder feed cartridge 804 which moves the powder towards a build surface (platform of plateau) 806, which is moved by movement mechanism 808 that lowers and raises (z axis) the platform or platen 806 as required. A laser 810 and scanning configuration 812 generates scanning laser beam 814 in accordance with preprogrammed instructions to generate a 3D object on platform or platen 806. A powder feed cartridge 816 provides additional feed as necessary.

Figure 9:
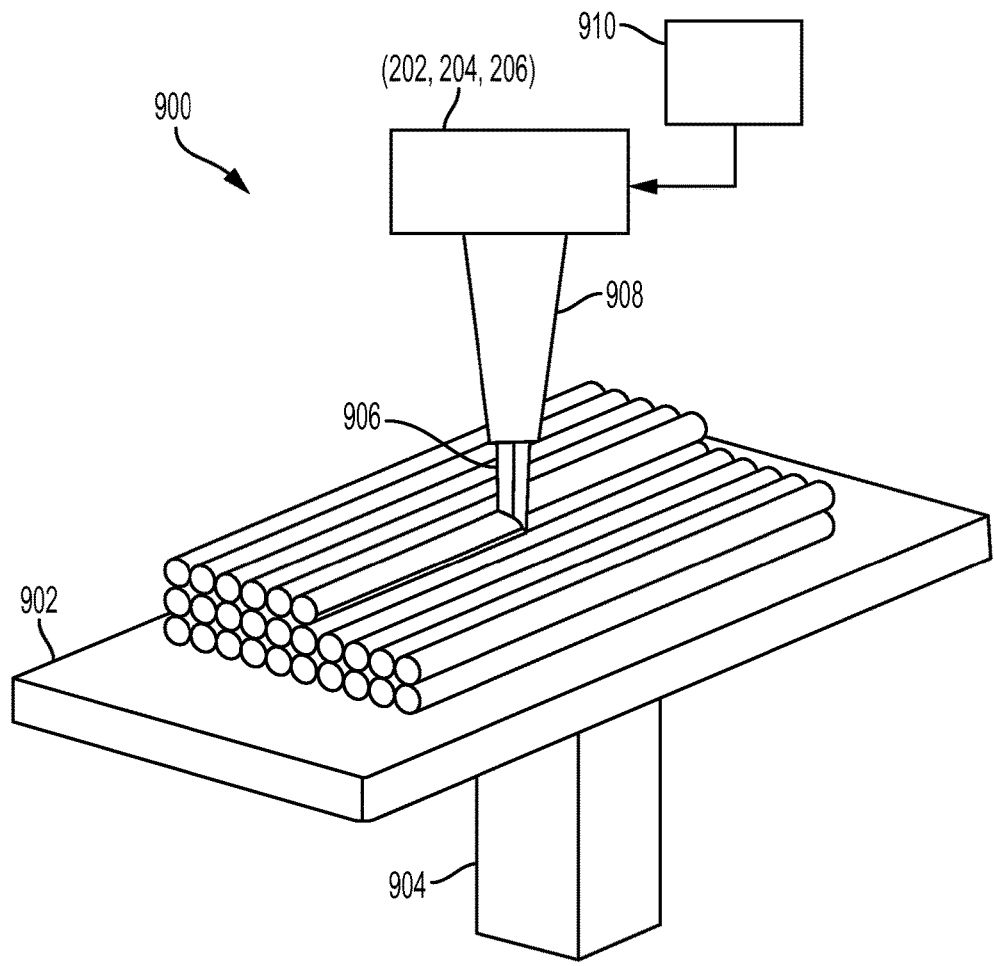
FIG. 9 illustrates an extrusion based subsystem configured for incorporation into the systems of FIGS. 1 and 2.

Turning to FIG. 9, illustrated is an extrusion subsystem 900, including a platform or platen 902, which is movable in the z direction by a movement mechanism 904, as known in the art. A hot, thermoplastic or other material 906 is dispensed by an extrusion process, particularly the hot thermoplastic is extruded from a temperature controlled print head 908, which receives the thermoplastic from a material delivery system 910, to produce a robust object with a high degree of accuracy. In various embodiments, the temperature controlled print head 906 is provided with a mechanism to move in the x, y directions as it lays down the material (e.g., such as mentioned in FIG. 2—202, 204, 206), and as is known in the art.

Figure 10:
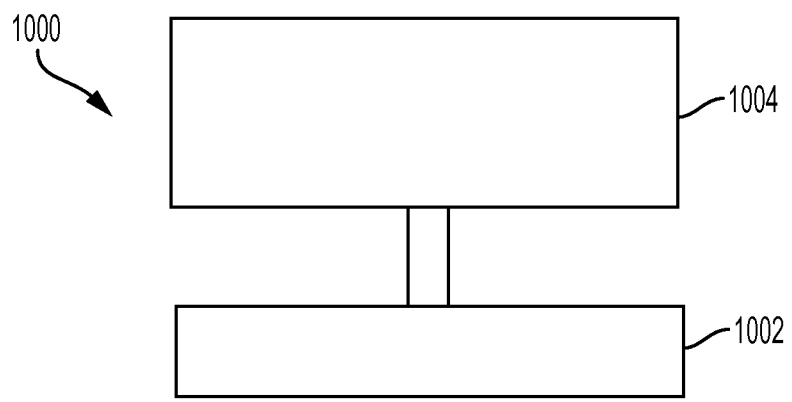
FIG. 10 depicts a curing or setting subsystem configured for incorporation into the systems of FIGS. 1 and 2.
Figure 11:
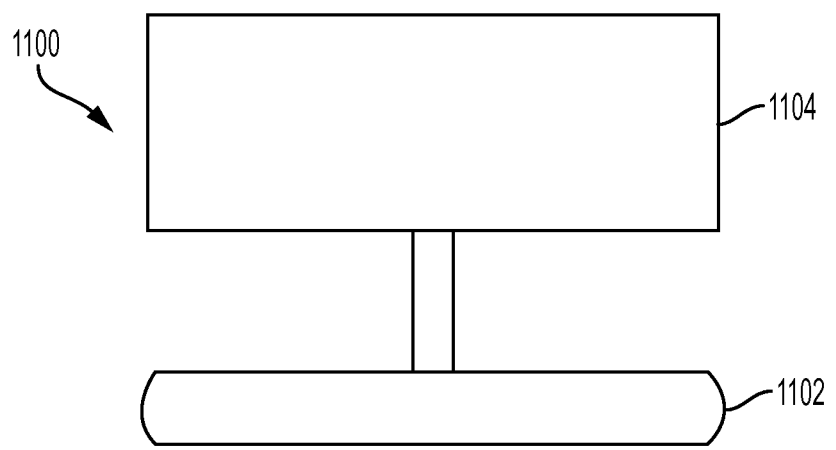
FIG. 11 depicts an alternative curing or setting subsystem configured for incorporation into the systems of FIGS. 1 and 2.

FIG. 10 illustrates an infrared (IR), ultraviolet (UV) or other light based subsystem 1000, and FIG. 11 illustrates heater based curing and/or setting subsystem 1100. Each subsystem respectively includes curing and/or setting components (e.g., light systems 1002 such as UV, IR or other appropriate components; and/or air-based heating components 1102 such as hot air heaters, etc.) and movement mechanisms 1002, 1004 which are used to place the IR, UF, Air-based subsystems at the appropriate locations for curing and/or setting operations. As previously mentioned, these subsystems are, in certain embodiments, employed as the build process is ongoing (e.g., additional slices or layers are to be built), as well as after all build operations have been completed.

The 3D additive manufacturing systems and subsystems described in the foregoing FIGS. 1-11 provide a manner in which an object consisting of an assembly of parts may be built within a defined area (i.e., not moving the object being built form one platform to another platform), where different materials will be in the final object. In other words, it will be materials that are maintained in the final object. This is distinct from systems where only a sacrificial material is laid down to support cavities or openings, etc., during the build. In other words, when a sacrificial material for a 3D additive manufacturing process is used, the sacrificial material is not found in the final object.

Figure 12:
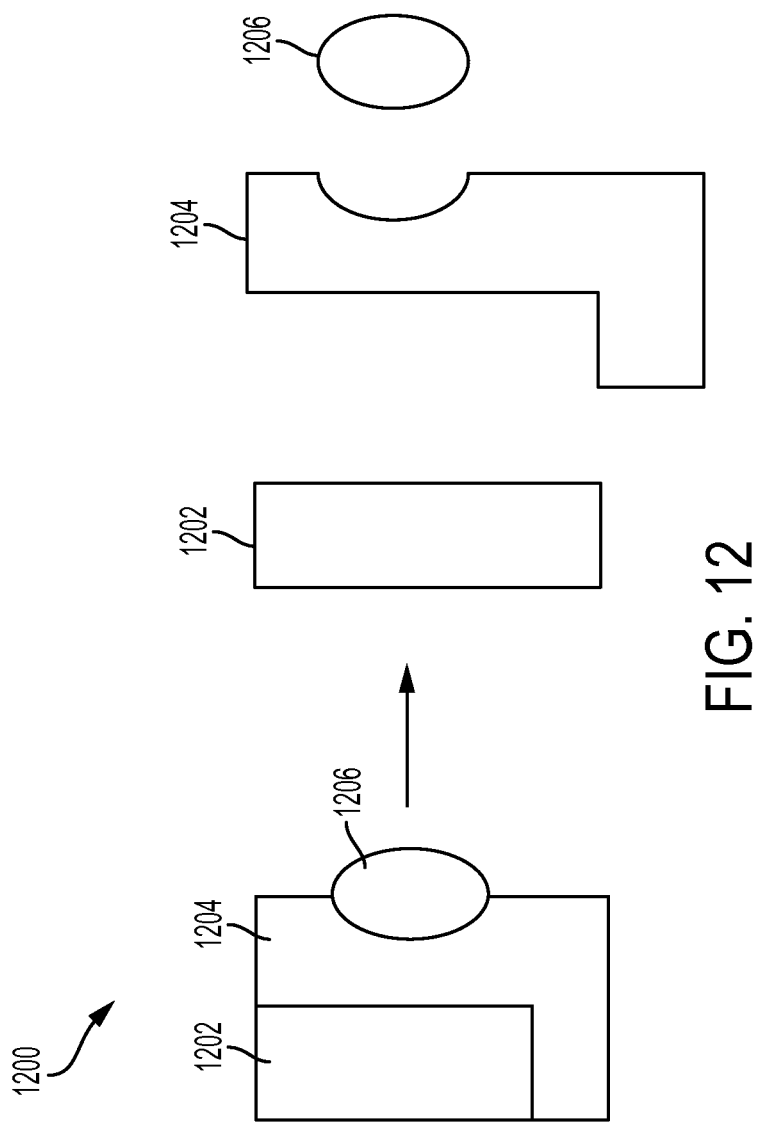
FIG. 12 is a side view of a multi-part object (assembly of parts) where each of the individual parts are configured by distinct 3D additive manufacturing subsystems including the use of distinct materials and processes.

On the other hand, the systems of FIGS. 1 and 2 and their associated methods permit for the production of multi-part objects. For instance, FIG. 12 is a side view of a multi-part object 1200 which consists of three separate parts (block) 1202, (L-shaped block) 1204 and (sphere) 1206. This object is also shown in FIG. 12 in an expanded view to more clearly emphasize that 1202, 1204 and 1206 are separate objects manufactured using different 3D additive manufacturing subsystems and correspondingly distinct methods and materials. It is to be appreciated object 1200 is provided simply for explanation, and is not intended to be limiting as to the types of objects which may be built according to the present teachings.

While there are methods available today for integrating electrical PCB and Flex and LEX physical layouts into mechanical solid models (i.e., SolidWorks® and CircuitWorks®, among others). Applicant is unaware of any methods to translate these capabilities to additive manufacturing. The present application, which provides the 3D additive manufacturing system having multiple subsystems, also addresses this issue.

More specifically, the present application describes methods to organize and specify printing operations for the building of multi-part 3D objects designed to be made from different materials, different deposition methods, and with designs potentially made from multiple disparate CAD sources. Thus, the to be described methods are applicable for cases where the object to be built is an assembly made up of multiple parts such as shown in FIG. 12 which, again, uses different materials which need to be deposited by different deposition subsystems commonly also require different inter/post deposition treatments (i.e., UV and/or thermal). Such objects may be designed, for example, with a 3D solid modeling design software, such as SolidWorks® or other appropriate software.

Figure 13A:
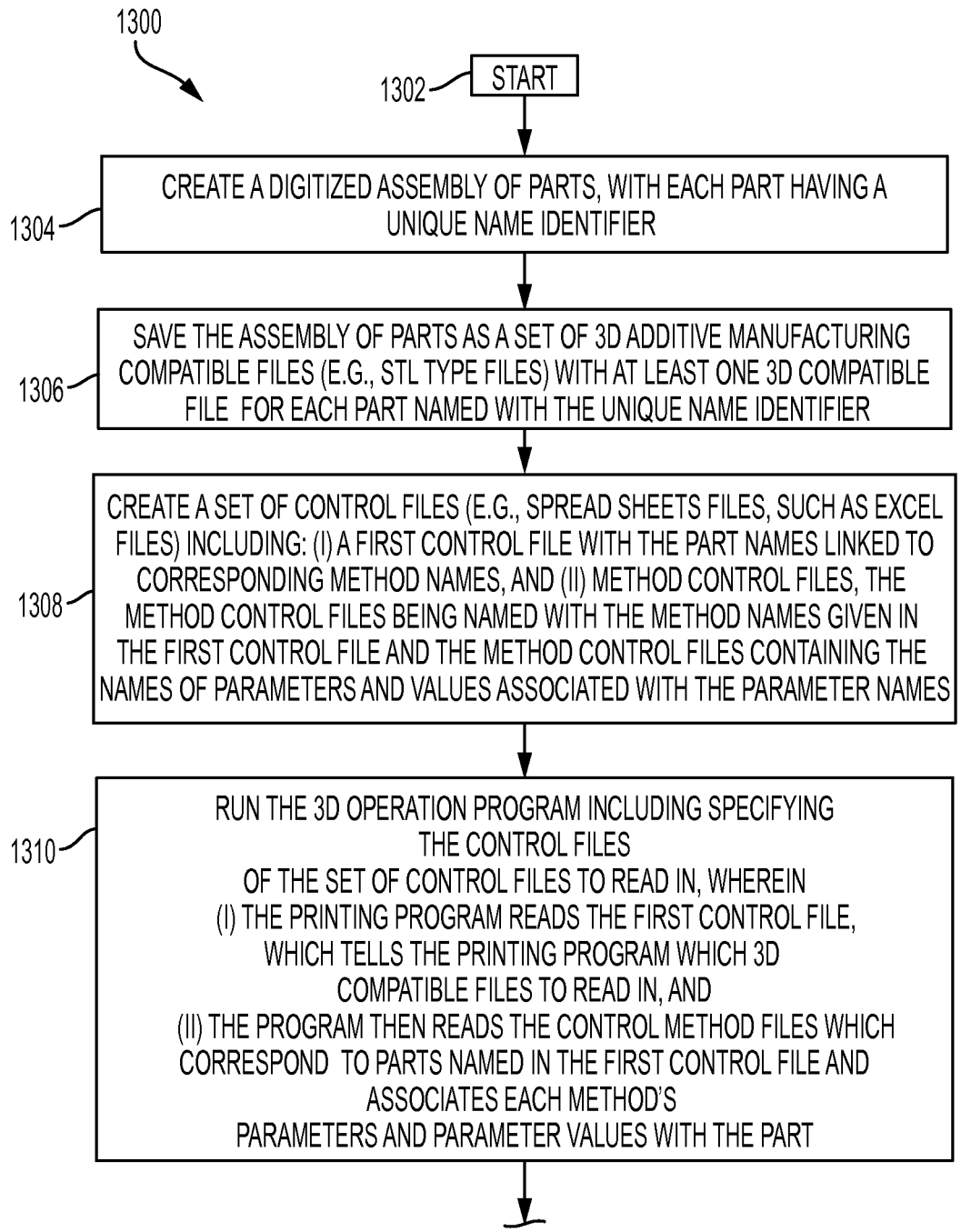
FIGS. 13A-13B illustrate a flow diagram describing a method implemented in the 3D additive manufacturing systems employing multiple 3D additive subsystems, such as shown in FIGS. 1 and 2.
Figure 13B:
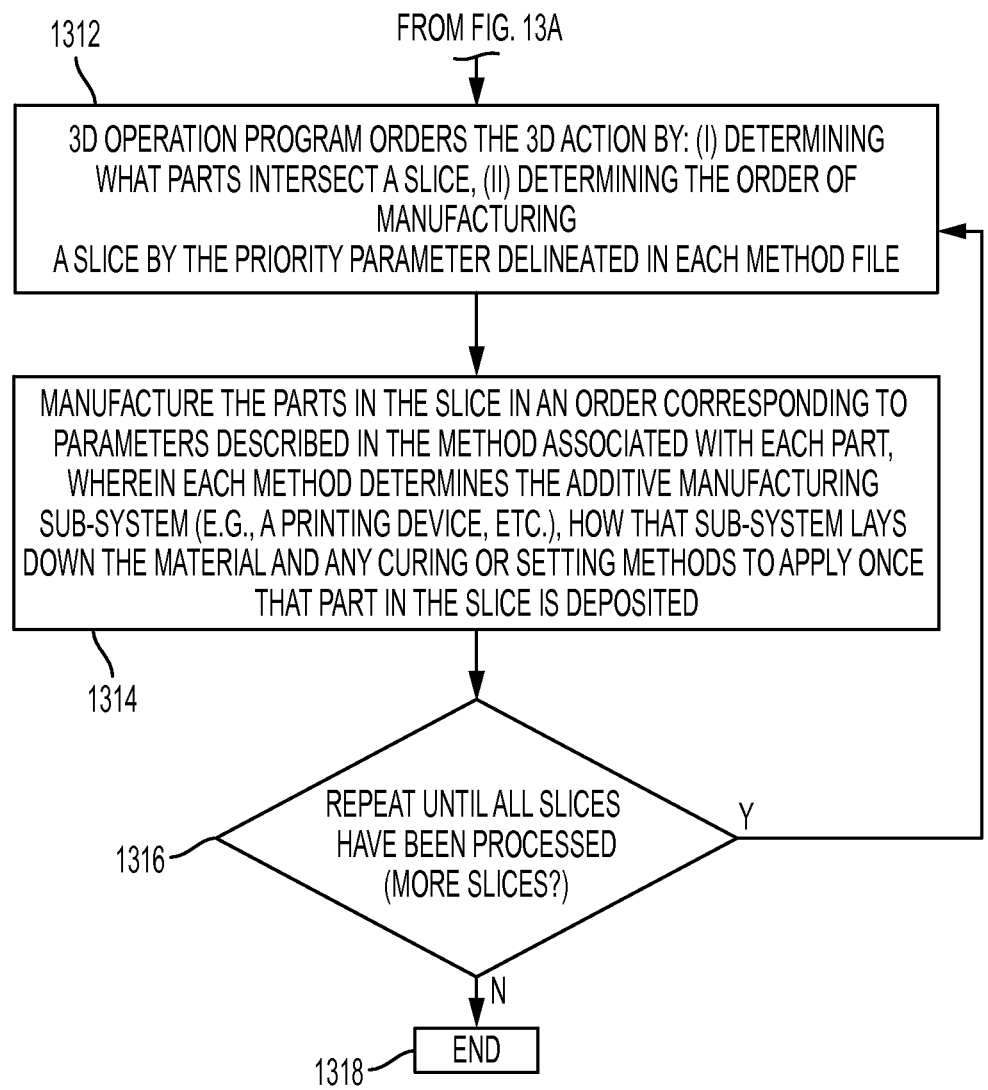

Turning to FIGS. 13A and 13B, illustrated is a flow diagram 1300 which discloses an embodiment to accomplish the foregoing generation of objects using a single 3D additive manufacturing system which employs multiple distinct 3D additive manufacturing subsystems and which operate to generate a multi-part object at a single location. In other words, the 3D multi-part object is built on the same platform or platen, while different 3D additive manufacturing subsystems and corresponding materials employed.

After the start 1302 of the process, a user creates a digitized assembly of parts, with each part having a unique name identifier (1304). This step may be accomplished at the same time additional steps of this method are performed, or alternatively these digitized assembly of parts may have been created in the past and stored for use in the future (e.g., in a library of parts). The creation of parts may be accomplished by use of a Computer Aided Design (CAD) system or systems, including 3D CAD systems as well as 2D CAD systems, and such CAD systems may be separate or distinct CAD systems.

Thereafter, the assembly of parts are saved as a set of 3D additive manufacturing compatible files, where there is at least one 3D compatible file for each part named with the unique name identifiers (1306). The compatible files may be any presently known or developed file format, including but not limited to STL, OBG files, among others. The assembly of parts that are created and stored may be for a particular 3D object having multiple parts. It is to be understood the present system and method also anticipates that a library of 3D parts may have been created in the manner described, and saved for future use.

Next, a set of control files are created where there is a first control file with part names associated to corresponding method names. The set of control files, further including method control files corresponding with the method names of the first control file. The method control files contain the names of parameters and values associated with the parameter names required for the building of the 3D object (1308). Thus, what is being provided is a hierarchical structure which links or otherwise associates different part designs in an assembly of parts to particular deposition methods and treatments.

In one embodiment, the files described above are implemented as spreadsheets, such as Excel® cell spreadsheets. It is, of course, to be understood that the process described herein does not need to use a spreadsheet format. Rather, the present concepts may be accomplished by designing the same sequencing and data entry in a software program, for example, where a primary program will call subprograms based on the criteria disclosed herein. It is noted the use of spreadsheets such as the Excel® spreadsheets lend themselves to an easy manner of extension, as deposition and treatment methods are added, as well as when new forms of design files and 3D additive manufacturing subsystems are added or changed.

Having created a set of control files, the 3D operation program is implemented (or run), where such operations include the specifying of the set of control files to read in the program, including having the operational program read the first control file of the set of control files. This tells the printing program which 3D compatible files to read in (e.g., the files which include instructions to control the various 3D additive manufacturing subsystems of the 3D additive manufacturing system(s) of FIGS. 1 and 2. Thereafter the program reads the control method files which correspond to the parts named in the first control file (i.e., of the set of control files) and associates each method parameters and parameter values with the part to be additively manufactured (1310).

The 3D operation program orders the deposition operations (i.e., laying down of layers) by (i) determining what parts intersect a slice to be manufactured, and (ii) determining the order of manufacturing the slice by a priority parameter delineated in each method file (1312). The priority parameter which will be discussed in more detail below, is included in the method files for an object (i.e., an assembly of parts) which is to be built having multiple parts being manufactured by distinct 3D additive manufacturing methods and processes. Particularly, within a slice which has more than a single part, the files contain a priority numbering whereby the highest priority part within that slice will be manufactured prior to other parts of the slice. In its simplest format, a part A will be given a priority parameter 1, a part B priority parameter 2, and a part C a priority parameter 3. Then in operation of the program, part A will be manufactured first, part B second, and part C third (step 1314). With additional discussion related to this topic, attention is directed to the top view shown in FIG. 12 of multi-part object 1200.

Further, as previously mentioned, FIG. 12 includes block 1202, L-block 1204 and oblong spheroid 1206. During the design and building of this multi-part object 1200, there will be times when multiple parts are within a same slice. In other words, a particular slice of the object being built will contain more than a single part. As object 1200 (shown in a side view) is being built up, the lower portion of the build will be substantially just the bottom of L-block 1204. However, as the object continues to be built, the above-discussed situation will occur where there will be all three parts 1202, 1204 and 1206 within a single slice (it is noted there is also a time when two of the three parts 1202, 1204, 1206 are in a slice together, and where the oblong spheroid 1206 will be the only part in a slice, i.e., the spheroid extends past the ends of the other parts 1202, 1204). In either case, during the design for this object, priority attributes will designate which part 1202, 1204 and 1206 will be built first in such multi-part slices. As mentioned, commonly each part may be built using a different material and using a different and distinct 3D additive manufacturing subsystem. The use of the priority attributes provide an organized manner in which to operate the multiple subsystems of the 3D additive manufacturing system (FIGS. 1 and 2) when building a multi-part object.

Having input the data and delineated information, as mentioned above, the program will manufacture the parts in the slice in an order corresponding to the parameters described in the method associated with each part. Each described method, includes information which determines the type of additive manufacturing subsystem to be used (e.g., those shown in FIGS. 1-11, among others), how that subsystem will lay down the material, as well as any curing or setting subsystems and methods that need to be applied once that part in the slice is deposited. Then, the program will repeat the above in accordance with the program slice by slice, until the 3D object is fully completed (1316), and thereafter the process ends (1318).

Figure 14:
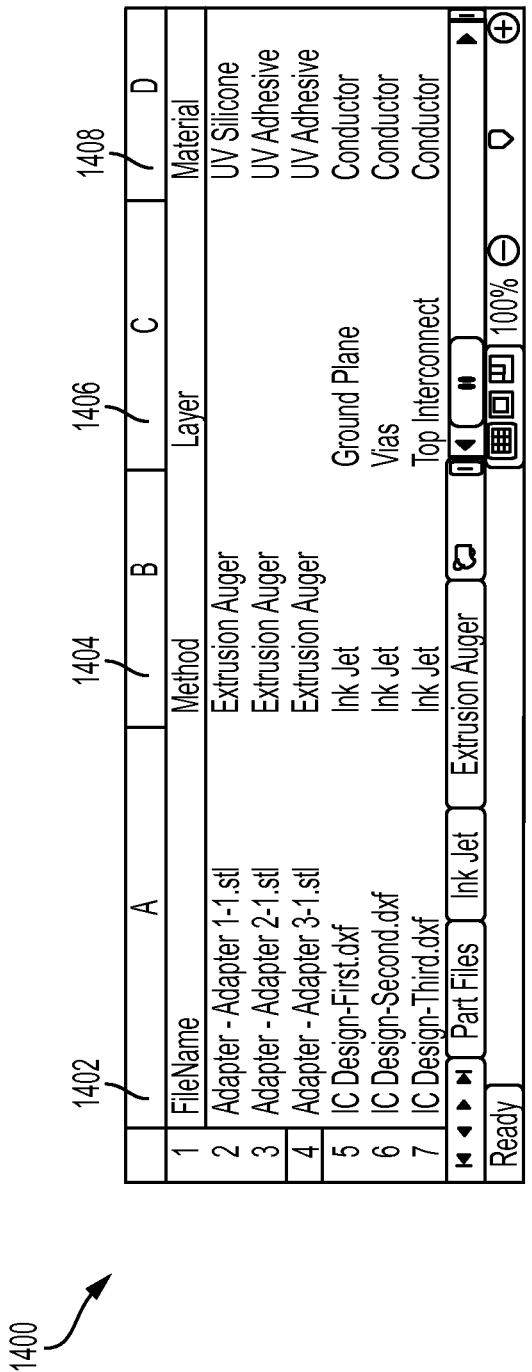
FIG. 14 illustrates a first control spreadsheet of a set of control spreadsheets.

Turning to FIGS. 14 and 15, illustrated is an embodiment which employs spreadsheets to control the build process. More particularly, FIG. 14 is a first spreadsheet 1400 which contains information to read in individual parts of the design for a particular multi-part object (e.g., an assembly of parts). This includes a file name column 1402, and a method name column 1404 which associates a part name with a deposition/treatment method that is to be described in a separate deposition spreadsheet within the same set of files. Spreadsheet 1400 further includes a column which defines the type of layer 1406 and the material 1408 used for the particular additive manufacturing subsystem being used (more particularly, the method column defines a specific spreadsheet in the set of files which contain the parameters for deposition, including deposition type, every parameter with which that deposition type requires, post deposition treatment, and perhaps file-source specific parameters.

Turning to FIG. 15, arrangement 1500 includes a plurality of method spreadsheets 1502a-1502n where each method spreadsheet corresponds to particular parts and methods of FIG. 14. For ease of understanding the details of only one of the method spreadsheets 1502a is fully depicted. Spreadsheet 1502a is called based on selections made in the first control spreadsheet 1400 of FIG. 14, and includes an attribute column 1504, a value column 1506 and units column 1508. It is to be understood other columns and other information may also be included in spreadsheets 1502a-1502n. The spreadsheets may commonly be stored in memory locations of the computing device 124 ($124_1$-$124_n$)

The priority category 1510 includes attribute column 1504, where a priority value of 1 (1512) is shown in value column 1506. This indicates that there is at least one other part in the slice presently being deposited, and this particular part in the slice will be printed before any other. Further attributes include the deposition method to be used 1514, the path method to be used 1516, the cure method 1518, and the associated values and units for each of these attributes (i.e., found in the value column 1506 and units column 1508).

Figure 16:
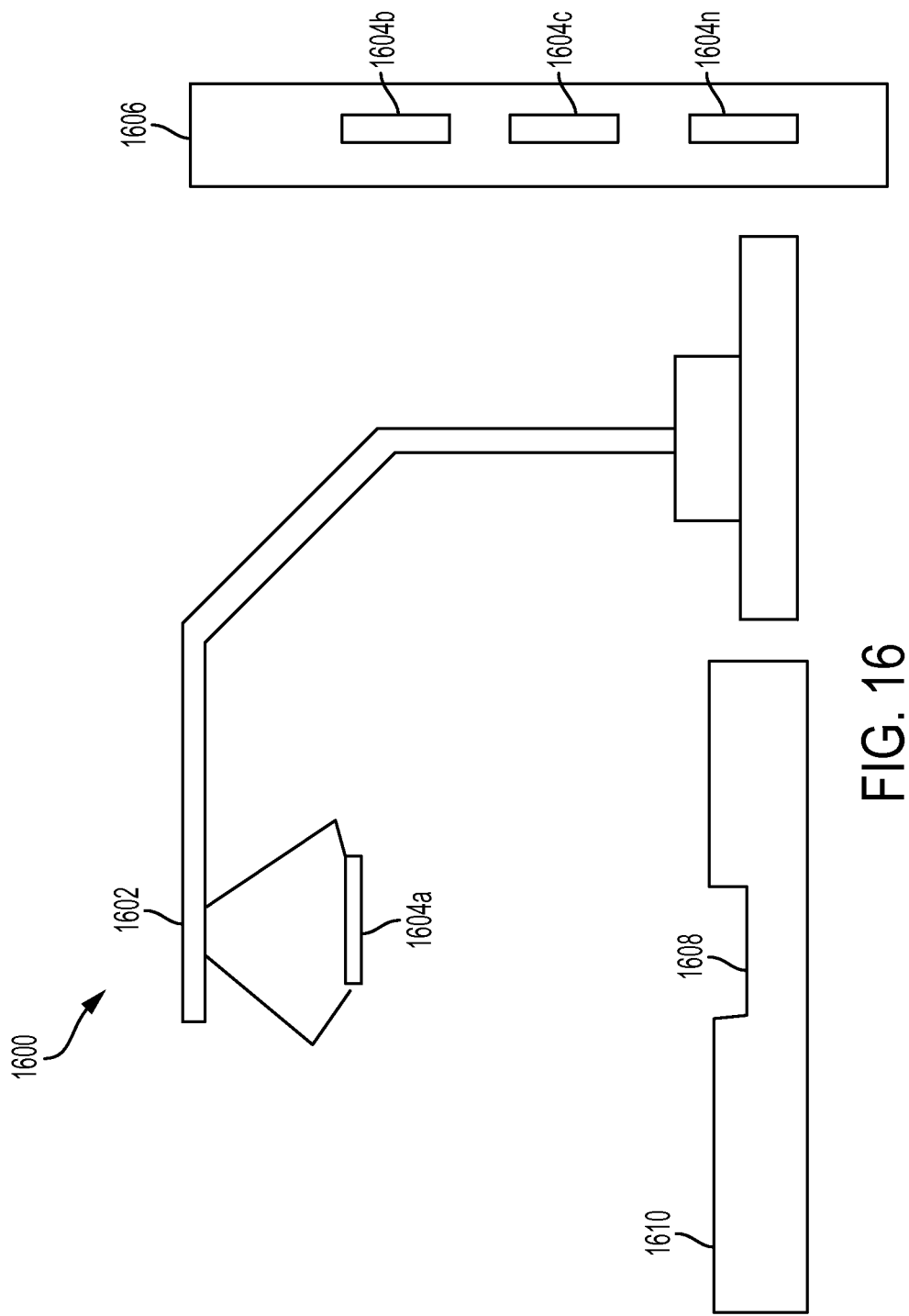
FIG. 16 illustrates a more detailed view of the pick-and-place concepts shown in connection with FIGS. 1 and 2.

Turning to FIG. 16, an embodiment of the pick-and-place system of FIGS. 1 and 2 is illustrated. In FIG. 16, system 1600 is embodied as a robotic arm system 1602, which allows for the selection of pre-constructed components 1604a-1604n from a container or holding area 1606, the selected pre-constructed components 1604a-1604n being able to be located within a hollowed area 1608 of a part 1610.

Figure 17:
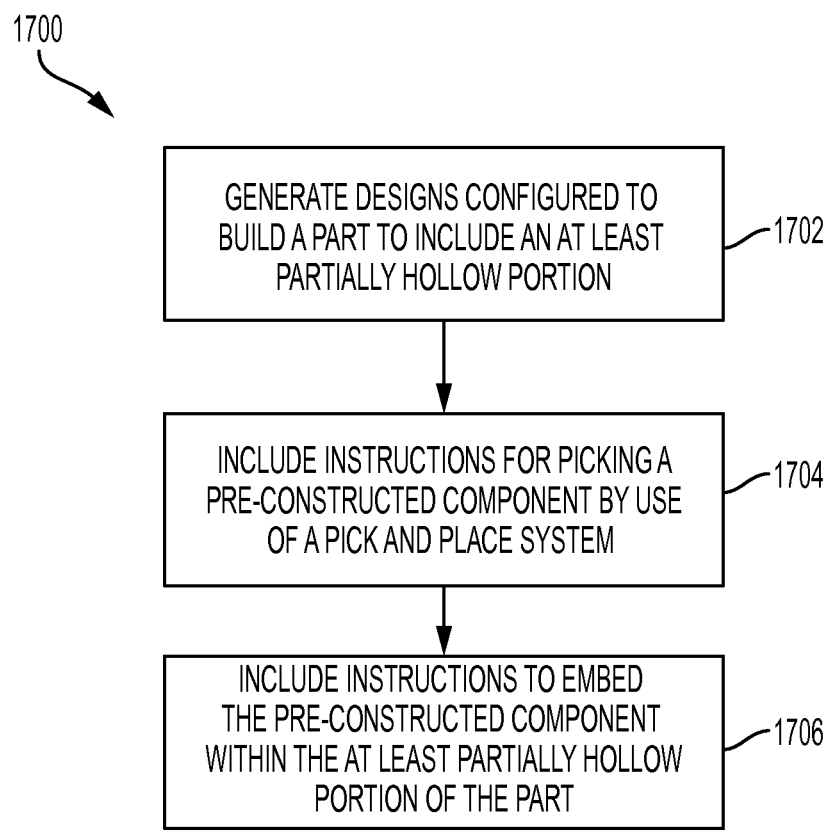
FIG. 17 is a flow diagram showing the method for implementing the pick-and-place concepts within the present application.

As shown in flow diagram 1700 of FIG. 17 and the illustration in FIG. 16, the instructions for the 3D additive manufacturing system configure a particular part to include at least a partially hollow portion (step 1702). The design of this arrangement would also then include instructions to operate the robotic arm system to pick a particular pre-constructed component (1704). Thereafter, the instructions cause the robotic arm system to insert the pre-constructed component is embedded within the partially hollowed out portion of the part (step 1706).

Figure 18:
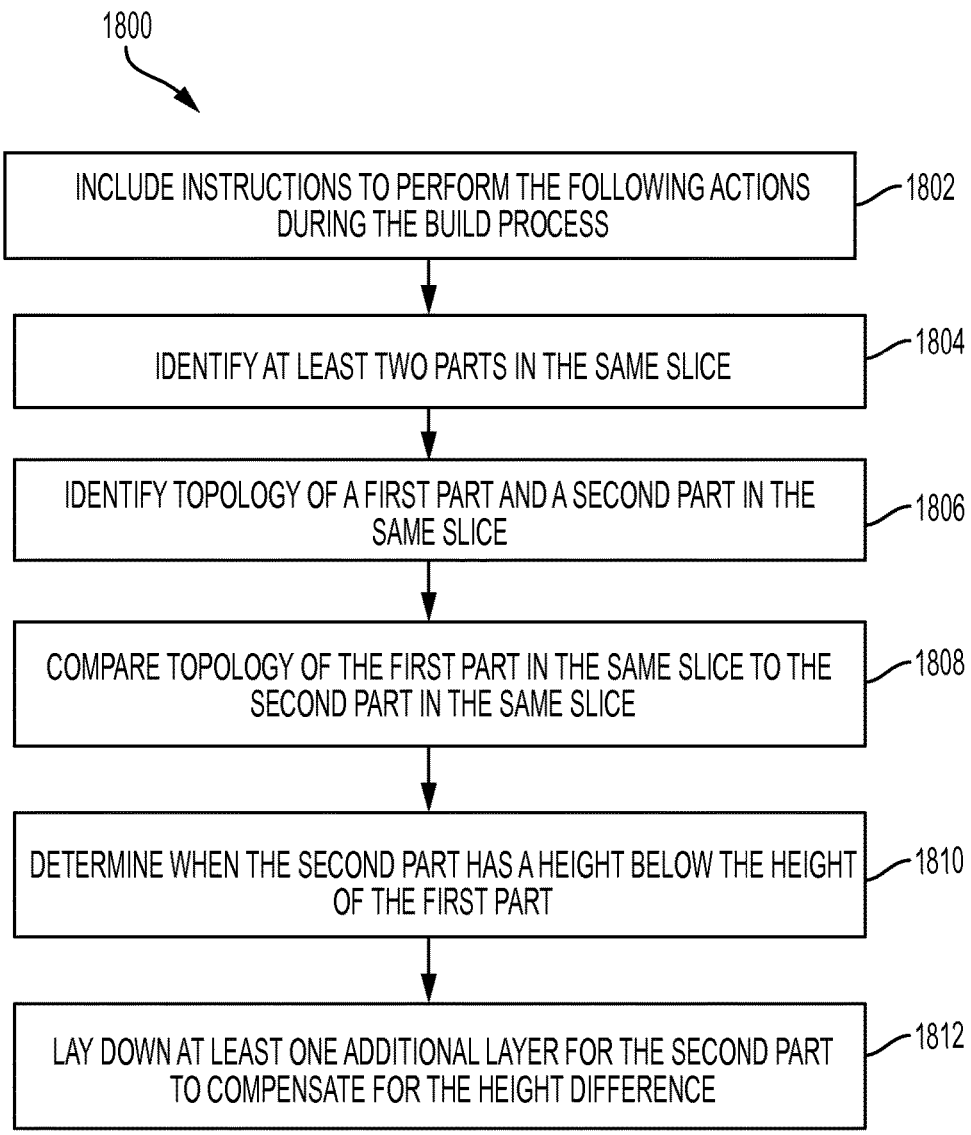
FIG. 18 is a flow diagram depicting topology acquiring steps implemented in the present application.

Turning to a further embodiment of the present application, attention is directed to flow diagram 1800 of FIG. 18. It is understood when a build is undertaken using different additive manufacturing subsystems which use different materials, the depth of one layer for one type of material may be different than that of another material. Therefore, the present embodiment employs a layer measuring system (e.g., see 112 of 160 of FIGS. 1 and 2). More particularly, as shown in flow diagram 1800, during the build process 1802, the system identifies at least two parts in the same slice 1804, as previously discussed. Then, the system further identifies the topology of a first part and a second part in the same slice 1806, and compares the topology (e.g., height) of the first part in the same slice to the second part of the same slice 1808. Thereafter, the measuring device determines when the second part is a height below the height of the first part 1810, and the program then instructs the particular additive manufacturing subsystem to lay down at least one additional layer for the second part to ensure the height at the end of the slice process are substantially identical 1812.

The foregoing discussion has taught methods and systems for 3-dimensional (3D) additive manufacturing. The following paragraphs set forth particular aspects of what has been described. This includes a method for 3D processing which includes (a) storing an assembly of parts with each part having a unique name identifier, the assembly of parts stored as a set of electronic files in a file format compatible with 3D additive manufacturing processes, with at least one compatible file for each part, and (b) creating a set of control files having a plurality of individual control files. These control files include (1) a first control file with the part names and method names, the method names corresponding to particular part names, and (2) a plurality of method control files, describing the methods named in the first control file, where the method control files contain (i) parameter names, and (ii) values associated with the parameter names. The method further includes: (c) running a 3D build program, for a specified set of control files including, (1) reading the first control file of the set of control files which instructs the 3D build program which 3D additive manufacturing compatible files to read in, and (2) reading the method control files which are named in the first control file and associating each method's parameters and parameter values with the parts of the first control file. Finally, the method includes: (d) performing build operations on a slice by slice basis in accordance with instructions of the 3D build program.

The set of control files are in certain embodiments configured as a set of spreadsheets.

The step of performing build operations includes determining, when there is more than one part in a slice currently being built, which parts of the assembly of parts intersect the slice currently being built; determining an order of building the parts in the slice currently being built by a priority parameter delineated in a corresponding method file; and building the parts in the slice in the order defined by the priority parameters described in the method associated with each part, where each method determines which 3D additive manufacturing subassembly to be used, how the subassembly builds material used by the subassembly and any in build to apply once a part in the slice has been deposited.

The method discussed herein further includes during the preforming of the build, steps of identifying a topology of a deposited physical layer of a first type of material, corresponding to a slice; identifying a topology of a deposited physical layer of a second type of material different from the first type of material, corresponding to the slice; comparing the identified physical layer having the first type of material and the physical layer having the second type of material; determining the physical layer having the second type of material has a height below the physical layer having the first type of material; and laying down at least one additional layer of the second type of material based on the comparing.

The method further includes using a topology identifying system to measure surface heights of a layer of material deposited during the build operation to obtain information related to the surface heights of the layer(s), and using the obtained information during a next deposition step to provide a manner of following a topology of the previously deposited layer.

The method further including depositing layers of at least one part of the assembly of parts, where an at least partially hollow portion is formed in the at least one portion of the part of the assembly of parts. Thereafter, a pre-constructed component is embedded within the at least partially hollow portion. The embedding of the pre-constructed component within the at least partially hollow portion includes automatically picking up the pre-constructed component from a location distant from the at least partially hollow portion.

The method of the application also includes at least two distinct 3D additive manufacturing subsystems and methods found among, stereolithography based systems and methods, fused deposition based systems and methods, selective laser sintering based systems and methods, multi-jet modelling based systems and methods, aerosol based systems and methods, powder bed and binder based systems and methods, extrusion based systems and methods, and aerosol based systems and methods.

The discussion has also taught another assembly production method which includes: (a) employing a 3D additive manufacturing system having at least two distinct 3D additive manufacturing subsystems which perform at least two distinct 3D additive manufacturing methods for forming layers, and which employ corresponding materials to be laid down as the layers. The materials are distinct from each other and correspond to the at least two distinct 3D additive manufacturing subsystems and methods; (b) storing a digitized assembly of parts, with each part having a unique name identifier, as a set of part files with at least one part file for each part of the assembly of parts in a file format compatible with a 3D additive manufacturing process implemented by the 3D additive manufacturing system; (c) creating a set of control files including, (1) a first control file linking the part names and method names, the method names corresponding to particular ones of the part names; and (2) a plurality of method control files, describing the methods named in the first control file, wherein the method control files contain (i) parameter names, and (ii) values associated with the parameter names; (d) running a 3D build program, for a specified set of control files including, (1) reading the first control file of the set of control files, which instructs the 3D build program which 3D additive manufacturing compatible files to read in, and (2) reading the method control files which are named in the first control file and associating each method's parameters and parameter values with the parts of the first control file; and finally (e) performing build operations on a slice by slice basis in accordance with instructions of the 3D build program.

The set of control files are in certain embodiments configured as a set of spreadsheets.

A particular slice of the assembly of parts includes at least two distinct parts of the assembly of parts.

The method further includes a step wherein each of the at least two distinct parts are formed using the at least two distinct 3D additive manufacturing subsystems, and materials, and each part of the slice includes priority attributes defining which part is to be processed first.

The method also includes, during the preforming of the build operations, identifying a topology of a deposited physical layer of a first type of material, corresponding to a slice; identifying a topology of a deposited physical layer of a second type of material different from the first type of material, corresponding to the slice; comparing the identified physical layer having the first type of material and the physical layer having the second type of material; determining the physical layer having the second type of material has a height below the physical layer having the first type of material; and laying down at least one additional layer of the second type of material based on the comparing.

The method further includes using a topology identifying system to measure surface heights of a layer of material deposited during the build operation to obtain information related to the surface heights of the layer(s), and using the obtained information during a next deposition step to provide a manner of following a topology of the previously deposited layer.

Still further, the method includes depositing layers of one of the parts of the assembly of parts, where an at least partially hollow portion is formed in the one of the parts of the assembly of parts. Thereafter a pre-constructed component is embedded within the at least partially hollow portion. The embedding of the pre-constructed component within the at least partially hollow portion includes automatically picking up the pre-constructed component from a location distant from the at least partially hollow portion.

The method of the application also includes the at least two distinct 3D additive manufacturing subsystems and methods are found among, stereolithography based systems and methods, fused deposition based systems and methods, selective laser sintering based systems and methods, multi-jet modelling based systems and methods, aerosol based systems and methods, powder bed and binder based systems and methods, and extrusion based systems and methods.

Still further, the method includes linking the part names and the methods in a hierarchical arrangement.

A particular 3D additive manufacturing system is taught as having a 3D additive manufacturing machine including, (1) at least two distinct 3D additive manufacturing subsystems which perform at least two distinct 3D additive manufacturing processes for depositing materials in the form of layers, wherein the materials are distinct from each other and correspond to the at least two distinct 3D additive manufacturing subsystems and processes; and (2) at least two distinct layer curing or setting systems configured to perform setting operations on the deposited layers, during a build procedure.

During the build procedure, a computing portion of the 3D additive manufacturing system is used to control operation of the 3D additive manufacturing system, the computing portion including at least an electronic processor, a memory, and input/output connections to provide an operative connection to the 3D additive manufacturing machine, the computing portion configured to store and access a digitized assembly of parts, with each part having a unique name identifier, as a set of files with at least one file for each part of the assembly of parts in a file format useable with a 3D additive manufacturing process implemented by the 3D additive manufacturing system. Further, the computing portion is configured to store and access a set of control files having a plurality individual control files including, (i) a first control file with the part names and method names, the method names corresponding to particular ones of the part names; and (ii) a plurality of method control files, which describe the methods named in the first control file, wherein in the method spreadsheets include, a first column of each of the method control files contain parameter names, and values associated with the parameter names.

The computing portion is also configured to store and access a 3D build program configured to, (i) read a first control file for a specified set of control files, which instructs the 3D build program which 3D additive manufacturing compatible files to read in, and (ii) read the method control files which are named in the first control file and associating each method's parameters and parameter values with the parts of the first control file; and wherein the 3D additive manufacturing system performs build operations on a slice by slice basis to generate a 3D object.

The system includes a set of control files configured as a set of spreadsheets.

Further, the system includes a build program further configured to: determine, when there is more than one part in a slice currently being built, which parts intersect the slice currently being built; determine the order of building the parts in the slice currently being built by a priority parameter delineated in each of the method control files; and build the parts in the slice in accordance with an order defined by the parameters described in the method associated with each part, where each method determines a 3D additive manufacturing subassembly to be used, how the subassembly builds material used by the subassembly and any in build processing to apply once a part in the slice has been deposited.

Still further, the system includes a height comparing mechanism configured to: identify a topology of a deposited physical layer of a first type of material, corresponding to a slice; identify a topology of a deposited physical layer of a second type of material different from the first type of material, corresponding to the slice; compare the identified physical layer having the first type of material and the physical layer having the second type of material; determine the physical layer having the second type of material has a height below the physical layer having the first type of material; and instruct the appropriate 3D additive manufacturing subsystem to deposit at least one additional layer of the second type of material.

Finally, the system further includes an automated pick and place system configured to pick a pre-constructed component and to place the pre-constructed component in a hollowed location of the assembly of parts that have been built.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for 3D processing using a single 3D machine having a single platform on which processing by multiple distinct 3D printing subsystems operate, the method comprising:
   (a) storing an assembly of parts with each part having a unique name identifier, the assembly of parts stored as a set of electronic files in a file format compatible with 3D additive manufacturing processes, with at least one compatible file for each part;
   (b) creating a set of control files having a plurality of individual control files including,
      (1) a first control file with the part names associated to corresponding method names, the method names, the method names corresponding to particular ones of the part names, and
      (2) a plurality of method control files corresponding with the method names of the first control file, and describing the methods named in the first control file, wherein the first control file and the plurality of method control files are distinct files from each other, and wherein the method control files include,
         (i) parameter names, and
         (ii) values associated with the parameter names, the set of control files being used for building multi-part 3D objects comprised of individual parts, wherein the set of control files are designed in a hierarchical structure which link different part designs in an assembly of parts to particular deposition methods and treatments, wherein at least some of the part designs are constructed of distinct materials which need to be deposited in accordance with deposition methods distinct from other ones of the part designs and which require different inter/post deposition treatments from other ones of the part designs and wherein individual parts of a particular multi-part object are built on the single platform;

(c) running a 3D build program, for a specified set of control files including,
  (1) reading the first control file of the set of control files which instructs the 3D build program which 3D additive manufacturing compatible files to read in, and
  (2) reading the method control files which are named in the first control file and associating each method's parameters and parameter values with the parts of the first control file; and (d) performing build operations on a slice by slice basis in accordance with instructions of the 3D build program, the build operations using the single 3D additive manufacturing system which employs the multiple distinct 3D additive manufacturing subsystems and which operates to generate the particular multi-part object on the single platform, wherein the particular multi-part object requires different materials, different deposition methods and designs, and wherein data for which is specified from at least two disparate Computer Aided Design (CAD) sources.

2. The method according to claim 1, wherein the set of control files are configured as a set of spreadsheets.

3. The method according to claim 1 wherein the step of performing build operations further includes:
  determining, when there is more than one part in a slice currently being built, which parts of the assembly of parts intersect the slice currently being built;
  determining an order of building the parts in the slice currently being built by a priority parameter delineated in a corresponding method file; and
  building the parts in the slice in the order defined by the priority parameters described in the method associated with each part, wherein each method determines which 3D additive manufacturing subassembly to be used, how the subassembly builds material used by the subassembly and any in build to apply once a part in the slice has been deposited which is formed at the single platform and where the single platform is not a conveyor platform.

4. The method according to claim 1 further including during the preforming of the build:
  identifying a topology of a deposited physical layer of a first type of material, corresponding to a slice;
  identifying a topology of a deposited physical layer of a second type of material different from the first type of material, corresponding to the slice;
  comparing the identified physical layer having the first type of material and the physical layer having the second type of material;
  determining the physical layer having the second type of material has a height below the physical layer having the first type of material; and
  laying down at least one additional layer of the second type of material based on the comparing.

5. The method according to claim 1 further including using a topology identifying system to measure surface heights of a layer of material deposited during the build operation to obtain information related to the surface heights, and
  using the obtained information during a next deposition step to provide a manner of following the topology of the previously deposited layer.

6. The method according to claim 1 further including depositing layers of at least one part of the assembly of parts, wherein an at least partially hollow portion is formed in the at least one portion of the part of the assembly of parts, and including embedding a pre-constructed component within the at least partially hollow portion, wherein the pre-constructed component includes at least one of integrated circuits, resistors, capacitors, optical devices, magnets, or sensors.

7. The method according to claim 6 wherein the embedding of the pre-constructed component within the at least partially hollow portion includes automatically picking up the pre-constructed component from a location distant from the at least partially hollow portion.

8. The method according to claim 1, wherein at least two distinct 3D additive manufacturing subsystems and methods are found among, stereolithography based systems and methods, fused deposition based systems and methods, selective laser sintering based systems and methods, multi-jet modelling based systems and methods, aerosol based systems and methods, powder bed and binder based systems and methods, extrusion based systems and methods, and aerosol based systems and methods.

9. The method according to claim 1, wherein the at least two disparate CAD sources include a 3D Computer Aided Design (CAD) system and a 2D Computer Aided Design (CAD) system.

10. A 3D assembly production method using a single 3D machine having a single platform on which processing by multiple distinct 3D printing subsystems operate, the method comprising:
  (a) employing a 3D additive manufacturing system having at least two distinct 3D additive manufacturing subsystems which perform at least two distinct 3D additive manufacturing methods for forming layers, and which employ corresponding materials to be laid down as the layers, wherein the materials are distinct from each other and correspond to the at least two distinct 3D additive manufacturing subsystems and methods;
  (b) storing a digitized assembly of parts, with each part having a unique name identifier, as a set of part files with at least one part file for each part of the assembly of parts in a file format compatible with a 3D additive manufacturing process implemented by the 3D additive manufacturing system;
  (c) creating a set of control files having a set of individual control files including,
    (1) a first control file linking the part names and associated to corresponding method names, the method names corresponding to particular ones of the part names;
    (2) a plurality of method control files corresponding to the method names of the first control file, and describing the methods named in the first control file, wherein the first control file and the plurality of method control files are distinct files from each other, and wherein the method control files include, (i) parameter names, and
(ii) values associated with the parameter names,
the set of control files being used for building multi-part 3D objects, comprised of individual parts, wherein the set of control files are designed in a hierarchical structure which link different part designs in an assembly of parts to particular deposition methods and treatments, wherein at least some of the part designs are constructed of distinct materials which need to be deposited in accordance with deposition methods distinct from other ones of the part designs and which require different inter/post deposition treatments from other ones of the part designs and wherein individual parts of a particular multi-part object are built on the single platform;

(d) running a 3D build program, for a specified set of control files including,
  (1) reading the first control file of the set of control files, which instructs the 3D build program which 3D additive manufacturing compatible files to read in, and
  (2) reading the method control files which are named in the first control file and associating each method's parameters and parameter values with the parts of the first control file; and (e) performing build operations on a slice by slice basis in accordance with instructions of the 3D build program, the build operations using the single 3D additive manufacturing system which employs the multiple distinct 3D additive manufacturing subsystems and which operates to generate the particular multi-part object on the single platform, wherein the particular multi-part object requires different materials, different deposition methods and designs, and wherein data for which is specified from at least two disparate Computer Aided Design (CAD) sources.

11. The method of claim 10 wherein a particular slice of the assembly of parts includes at least two distinct parts of the assembly of parts.

12. The method according to claim 11, wherein each of the at least two distinct parts are formed using the at least two distinct 3D additive manufacturing subsystems, and materials, and wherein each part of the slice includes priority attributes defining which part is to be processed first.

13. The method according to claim 10, further including during the preforming of the build operations:
identifying a topology of a deposited physical layer of a first type of material, corresponding to a slice;
identifying a topology of a deposited physical layer of a second type of material different from the first type of material, corresponding to the slice;
comparing the identified physical layer having the first type of material and the physical layer having the second type of material;
determining the physical layer having the second type of material has a height below the physical layer having the first type of material; and
laying down at least one additional layer of the second type of material based on the comparing.

14. The method according to claim 10 further including using a topology identifying system to premeasure surface heights of a layer of material deposited during the build operation to obtain information related to the surface heights, and
using the obtained information during a next deposition step to provide an accurate means of following a topology of the previously deposited layer.

15. The method according to claim 10 further including depositing layers of one of the parts of the assembly of parts, wherein an at least partially hollow portion is formed in the one of the parts of the assembly of parts, and embedding a pre-constructed component within the at least partially hollow portion, wherein the pre-constructed component includes at least one of integrated circuits, resistors, capacitors, optical devices, magnets, or sensors.

16. The method according to claim 15 wherein the embedding of the pre-constructed component within the at least partially hollow portion includes automatically picking up the pre-constructed component from a location distant from the at least partially hollow portion.

17. The method according to claim 10, wherein the at least two distinct 3D additive manufacturing subsystems and methods are found among, stereolithography based systems and methods, fused deposition based systems and methods, selective laser sintering based systems and methods, multi-jet modelling based systems and methods, aerosol based systems and methods, powder bed and binder based systems and methods, and extrusion based systems and methods.

18. The method according to claim 10, wherein the at least two disparate CAD sources include a 3D Computer Aided Design (CAD) system and a 2D Computer Aided Design (CAD) system.

19. A 3D additive manufacturing system using a single 3D machine having a single platform on which processing by multiple distinct 3D printing subsystems operate, the method comprising:

(a) a 3D additive manufacturing machine including,
  (1) at least two distinct 3D additive manufacturing subsystems which perform at least two distinct 3D additive manufacturing processes for depositing materials in the form of layers, wherein the materials are distinct from each other and correspond to the at least two distinct 3D additive manufacturing subsystems and processes;
  (2) at least two distinct layer curing or setting systems configured to perform setting operations on the deposited layers, during a build procedure;

(b) a computing portion of the 3D additive manufacturing system to control operation of the 3D additive manufacturing machine, the computing portion including at least an electronic processor, a memory, and input/output connections to provide an operative connection to the 3D additive manufacturing machine, the computing portion configured to,
  (1) store and access a digitized assembly of parts, with each part having a unique name identifier, as a set of files with at least one file for each part of the assembly of parts in a file format useable with a 3D additive manufacturing process implemented by the 3D additive manufacturing system;
  (2) store and access a set of control files having a plurality individual control files including,
    (i) a first control file with the part names associated to corresponding method names, the method names corresponding to particular ones of the part names;
    (ii) a plurality of method control files corresponding to the method names of the first control file, and which describe the methods named in the first control file, wherein the first control file and the plurality of method control files are distinct files from each other, and wherein the method control files contain parameter names, and values associated with the parameter names, the set of control files being used for building multi-part 3D objects comprised of individual parts, wherein the set of control files are designed in a hierarchical structure which link different part designs in an assembly of parts to particular deposition methods and treatments, wherein at least some of the part designs are constructed of distinct materials which need to be deposited in accordance with deposition methods distinct from other ones of the part designs and which require different inter/post deposition treatments from other ones of the part designs and wherein individual parts of the multi-part objects are built on a same single platform;

(3) store and access a 3D build program configured to,
(i) read a first control file for a specified set of control files, which instructs the 3D build program which 3D additive manufacturing compatible files to read in,
(ii) read the method control files which are named in the first control file and associating each method's parameters and parameter values with the parts of the first control file; and wherein the 3D additive manufacturing system performs build operations on a slice by slice basis to generate a 3D object, the build operations using the single 3D additive manufacturing system which employs the multiple distinct 3D additive manufacturing subsystems and which operates to generate the particular multi-part object on the single platform, wherein the particular multi-part object requires different materials, different deposition methods and designs, and wherein the system is designed to obtain data from at least two disparate Computer Aided Design (CAD) sources.

20. The system according to claim 19 wherein the build program is further configured to:

determine, when there is more than one part in a slice currently being built, which parts intersect the slice currently being built;

determine the order of building the parts in the slice currently being built by a priority parameter delineated in each of the method control files; and build the parts in the slice in accordance with an order defined by the parameters described in the method associated with each part, wherein each method determines a 3D additive manufacturing subassembly to be used, how the subassembly builds material used by the subassembly and any in build processing to apply once a part in the slice has been deposited.

21. The system according to claim 19, further including height comparing mechanism configured to:

identify a topology of a deposited physical layer of a first type of material, corresponding to a slice;

identify a topology of a deposited physical layer of a second type of material different from the first type of material, corresponding to the slice;

compare the identified physical layer having the first type of material and the physical layer having the second type of material;

determine the physical layer having the second type of material has a height below the physical layer having the first type of material; and instruct the appropriate 3D additive manufacturing subsystem to deposit at least one additional layer of the second type of material.

22. The system according to claim 19, wherein the at least two disparate CAD sources include a 3D Computer Aided Design (CAD) system and a 2D Computer Aided Design (CAD) system.

* * * * *